H. SYNCK.
SPREADER FOR FERTILIZER DISTRIBUTERS.
APPLICATION FILED MAY 2, 1917.

1,248,032.

Patented Nov. 27, 1917.
2 SHEETS—SHEET 1.

Inventor
H. Synck

By ............., Attorneys

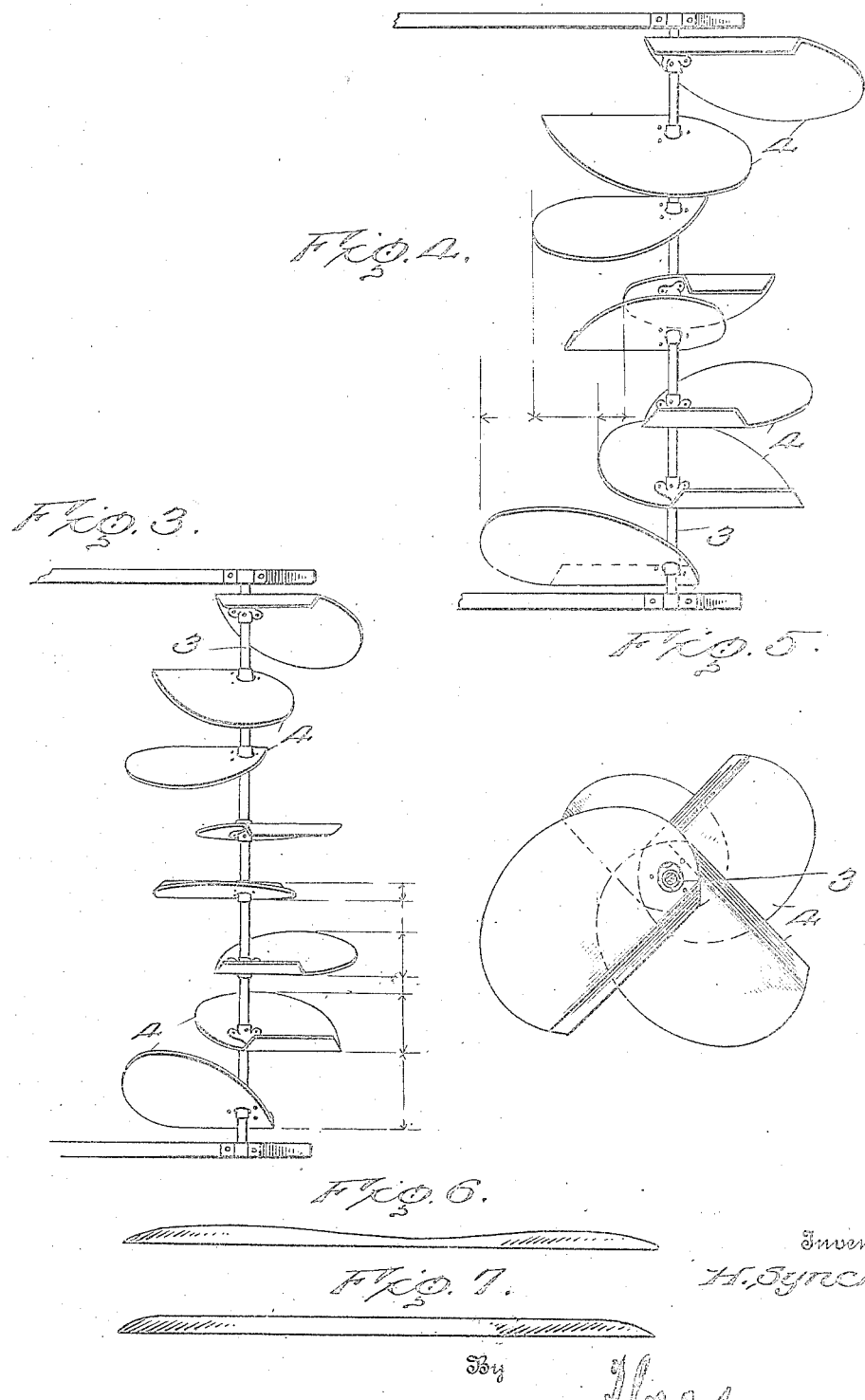

UNITED STATES PATENT OFFICE.

HENRY SYNCK, OF COLDWATER, OHIO, ASSIGNOR TO NEW IDEA SPREADER CO., OF COLDWATER, OHIO.

SPREADER FOR FERTILIZER-DISTRIBUTERS.

1,248,032.

Specification of Letters Patent.

Patented Nov. 27, 1917.

Application filed May 2, 1917. Serial No. 165,994.

*To all whom it may concern:*

Be it known that I, HENRY SYNCK, a citizen of the United States, residing at Coldwater, in the county of Mercer and State of Ohio, have invented certain new and useful Improvements in Spreaders for Fertilizer-Distributers, of which the following is a specification.

This invention relates to fertilizer distributers and more particularly to the spreader mechanism thereof and is designed as an improvement upon the spreader structure shown in my Patent No. 1,213,554, issued Jan. 23, 1917. In the patented structure the spreader comprises a rotary shaft upon which are arranged a series of spreader blades, the blades being all of the same size, being equi-distantly spaced along the shaft, and all being obliquely disposed with relation to the shaft at the same angle. Theoretically, this arrangement of spreader blades should distribute the fertilizer in a manner to deposit a relatively wide swath of even thickness or substantially even thickness throughout its width. I have found in practice, however, that this is not strictly true as the fertilizer will be deposited in a swath thicker adjacent its side edges than at its middle. This is probably due to the fact that the blades are so constructed and arranged as to throw or spread the fertilizer laterally in opposite directions from a point at the middle of the shaft carrying the spreader blades. All of the blades are equally effective in laterally spreading the fertilizer and thus the two middle blades of the series will throw the fertilizer laterally in opposite directions with as great force and to the same distance as the blades at and adjacent the ends of the series with the result, as stated, that the swath deposited is of uneven thickness. As it is desirable that the fertilizer be deposited in swaths of even thickness throughout, except directly at the edges where the swaths slightly decrease in thickness so that the edges of adjacent swaths may overlap, the present invention aims to provide an arrangement whereby the blades will have gradually increasing effectiveness from the middle of the series toward the ends thereof so that the swath will be of even thickness, the fertilizer being spread or thrown a shorter distance in a lateral direction by the intermediate blades than by the end blades. The invention also has as its object to accomplish the new result above pointed out without, however, decreasing the width of the swath as deposited by the patented structure.

In the accompanying drawings:—

Fig. 3 is a similar view illustrating a modified arrangement whereby the desired result may be accomplished;

Fig. 4 is a view similar to Fig. 3 illustrating a further modified arrangement;

Fig. 5 is an end elevation of the structure shown in Fig. 4;

Figs. 6 and 7 are diagrammatic views illustrating respectively the swath deposited by the patented and improved structures.

Figure 1:
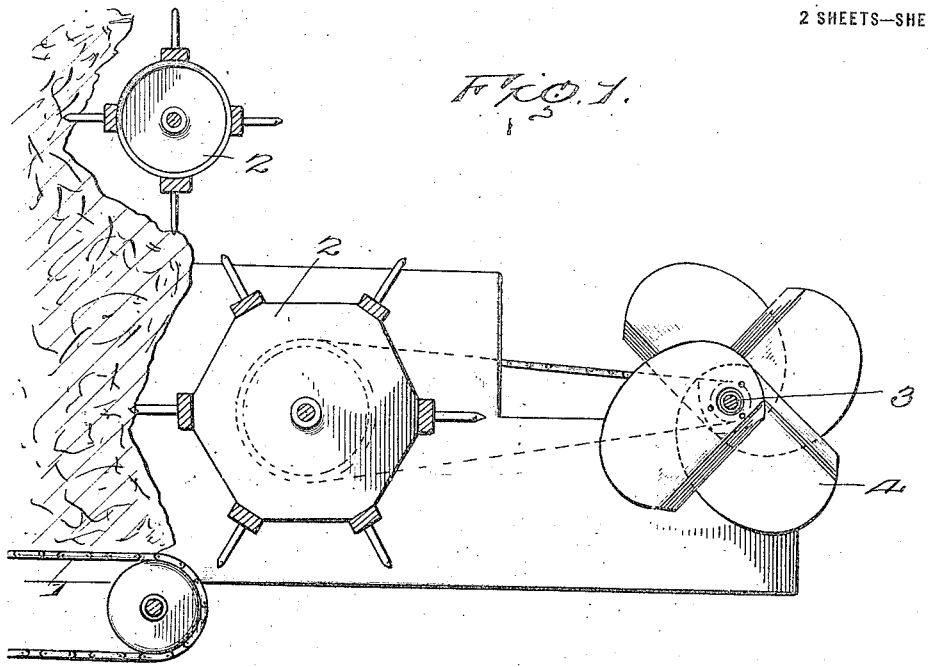
Figure 1 is a vertical longitudinal sectional view through fertilizer distributing mechanism illustrating the position of the spreader with relation to the beaters.
Figure 2:
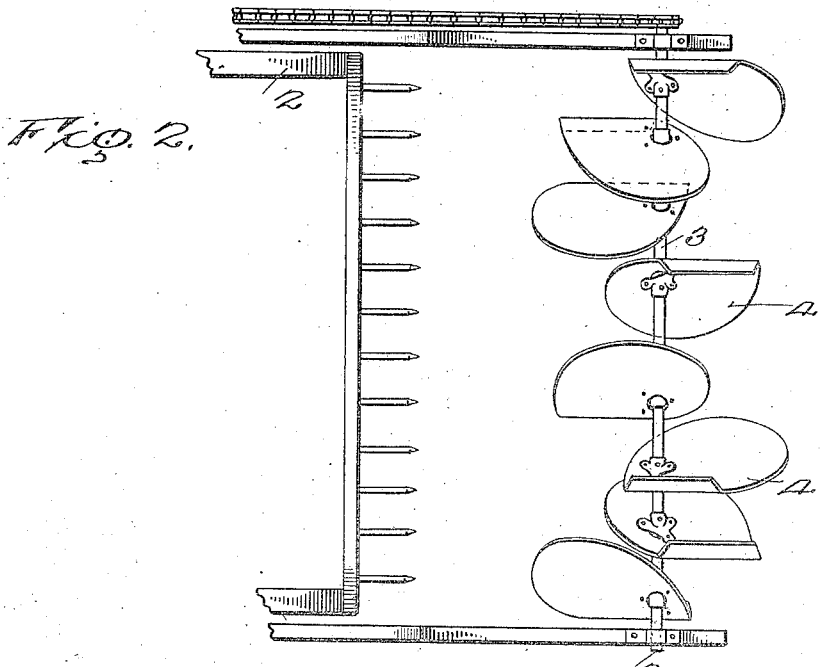
Fig. 2 is a top plan view illustrating one form of the invention.

In the drawings, Fig. 1 illustrates fertilizer distributing mechanism including the usual feed apron, indicated by the numeral 1, the beaters indicated by the numeral 2, and the spreader shaft indicated by the numeral 3, this shaft being rotatably mounted in the frame in which the remainder of the mechanism is housed and being driven as in the present instance, for example, from the shaft for the lower beater 2. The shaft 3 has fixed upon it the spreader blades and, as before stated, in the patented structure these blades are equi-distantly spaced along the shaft, are obliquely disposed with relation to the shaft at the same angle throughout the series, and are of the same size in that embodiment of the invention shown in Figs. 1 and 2 of the drawings. However, the blades are of the same size and are equi-distantly spaced along the shaft, but the said blades, which are indicated by the numeral 4 and which may be of any desired construction, are spaced apart along the shaft gradually decreasing distances from the middle of the series of blades toward the end of said series. For example, the two middle blades are relatively widely spaced and the respective blades next to them are spaced from them a slightly shorter distance and so on throughout the series toward each end thereof. Thus the spreader as a whole may be considered as having unequal spreading efficiency, the effectiveness of the spreader as a whole gradually increasing from the middle toward the ends thereof. As a result of this arrangement of the spreader blades a swath will be spread substantially as shown in Fig. 7 of the drawings, whereas when the blades are equi-distantly spaced along the shaft a swath will be spread as represented in Fig. 6 of the drawings.

In that form of the invention shown in Fig. 3 of the drawings the blades are equidistantly spaced along the shaft and are of the same diameter or size. However, the intermediate blades of the series are more nearly perpendicular to the shaft than the end blades of the series. In other words, the obliquity of the blades gradually increases from the middle toward the ends of the series so that the series as a whole is of gradually increasing effectiveness from the center toward the ends.

In the modified arrangement shown in Fig. 4 of the drawings the blades are equidistantly spaced along the shaft and are all disposed at the same angle with relation to the shaft. However, the two middle blades are considerably smaller than the end blades of the series and the said blades increase in diameter or size from the middle toward both ends of the series. In this instance also it will be understood that the series of blades as a whole is less effective at its middle than at its ends and that its effectiveness gradually increases from the middle toward the ends.

From the foregoing description of the invention it will be understood that in each of the three embodiments illustrated the spreader as a whole is of gradually increasing effectiveness from its middle toward its ends with the result that the swath spread or deposited will be of substantially uniform thickness throughout as shown in Fig. 7 of the drawings.

Having thus described the invention, what is claimed as new is:

1. In a fertilizer distributer, a rotary shaft, and a series of spreader blades mounted thereon, the blades being relatively spaced longitudinally of the shaft gradually decreasing distances from the middle of the series toward the ends.

2. In a fertilizer distributer, a rotary shaft, a series of spreader blades mounted thereon at an oblique angle to the axle of rotation thereof, the working edge of each blade describing a curve eccentric to the said shaft and gradually receding from the shaft in a direction opposite to the direction of rotation of the blade, the blades being arranged in series at the opposite sides of the middle of the shaft, and the blades of each series being so relatively positioned as to possess increasing effectiveness toward the outer end of the series.

3. In a fertilizer distributer, a rotary shaft, a series of spreader blades mounted thereon at an oblique angle to the axle of rotation thereof, the working edge of each blade describing a curve eccentric to the said shaft and gradually receding from the shaft in a direction opposite to the direction of rotation of the blade, the blades being arranged in series at the opposite sides of the middle of the shaft, the blades of each series having relatively increasing pitch from the inner end of the series to the outer end thereof.

In testimony whereof I affix my signature.

HENRY SYNCK. [L. S.]